UNITED STATES PATENT OFFICE.

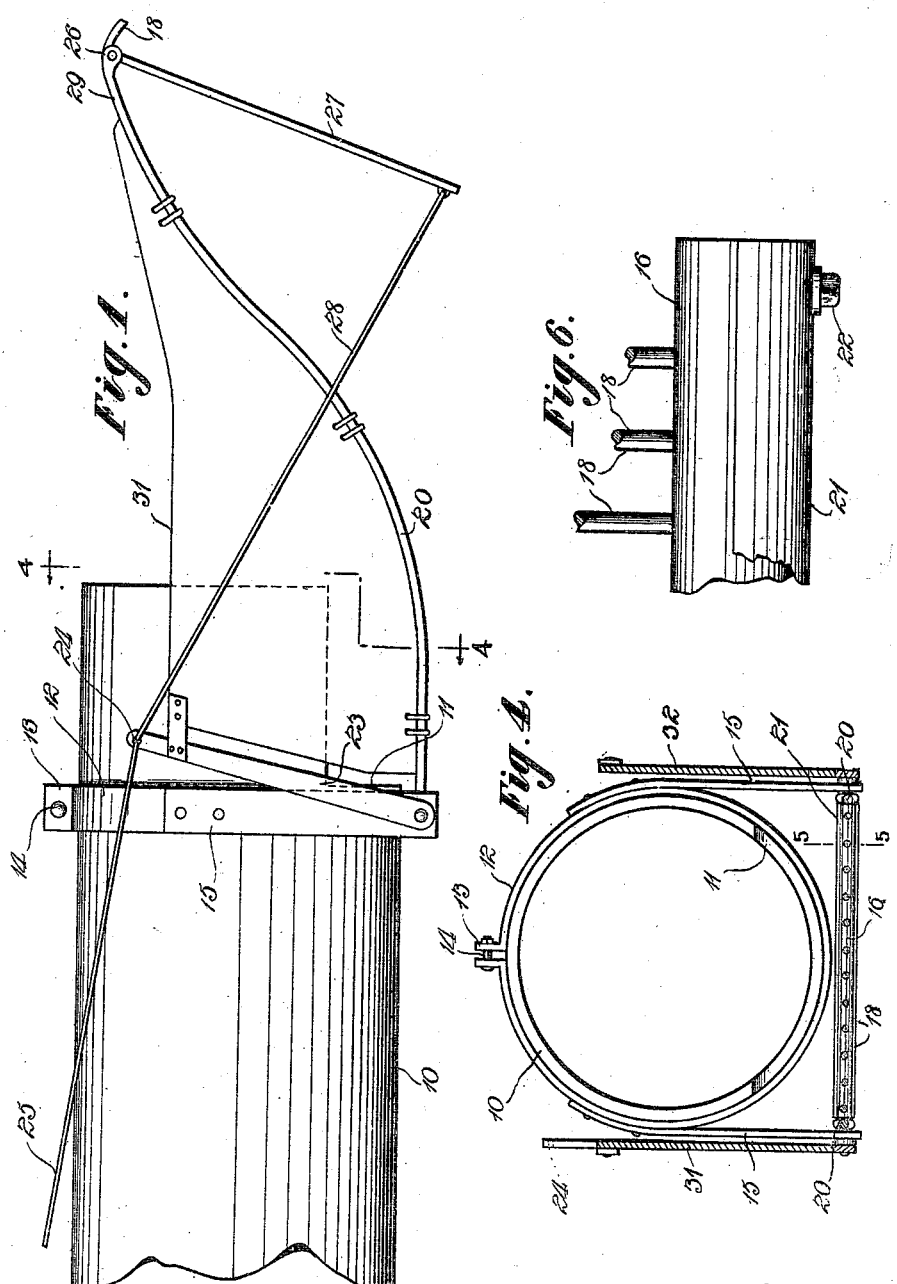

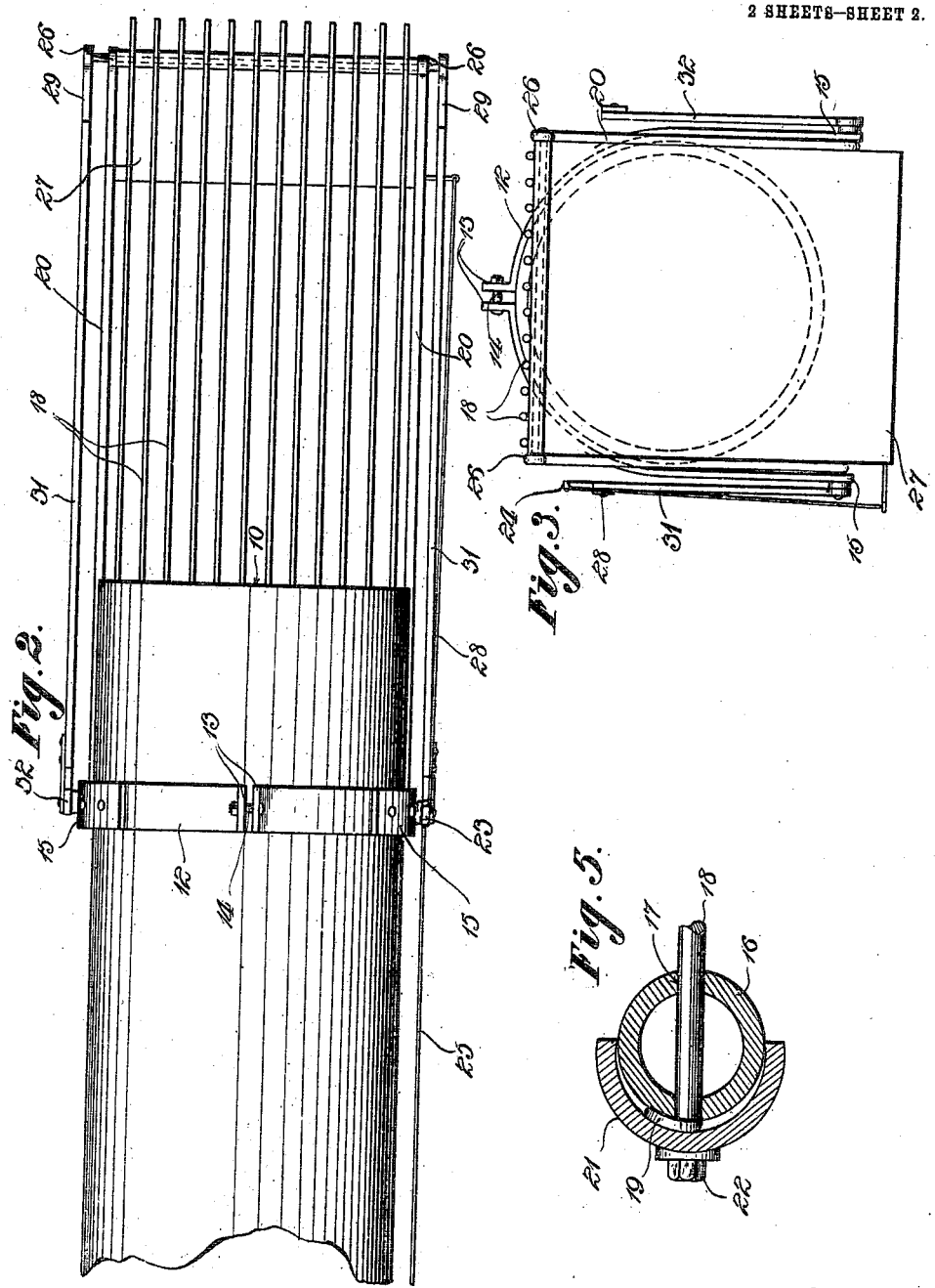

CONRAD LANGUM, OF VOLGA, SOUTH DAKOTA.

ATTACHMENT FOR HAY-STACKERS.

979,677.   Specification of Letters Patent.   Patented Dec. 27, 1910.

Application filed March 7, 1910.   Serial No. 547,784.

*To all whom it may concern:*

Be it known that I, CONRAD LANGUM, a citizen of the United States, residing at Volga, in the county of Brookings, State of South Dakota, have invented certain new and useful Improvements in Attachments for Hay-Stackers; and I do hereby declare the following to be a full, clear, and exact description of the invention, such as will enable others skilled in the art to which it appertains to make and use the same.

This invention relates to grain saving devices and has special reference to an attachment for pneumatic hay stackers.

It is a well understood fact that where pneumatic threshers and hay and straw stackers are used a considerable quantity of chaff mixed with a certain percentage of seed or grain is carried out of the blast or delivery tube into the stack. This results not only in the hay being dusty and unclean but also in direct loss of the seed which should be saved.

The principal object of the present invention is to provide an attachment to be secured adjacent the mouth of the delivery tube of a pneumatic hay stacker, the attachment being arranged to separate substantially all of the chaff and grain remaining in the hay so that only the clean hay is stacked while the mixed chaff and grain may be again winnowed, thus saving the seed.

The invention consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a side elevation of this invention as applied to the mouth of a delivery tube. Fig. 2 is a top plan view of the same. Fig. 3 is an end view thereof. Fig. 4 is a section on the line 4—4 of Fig. 1. Fig. 5 is an enlarged detail section on the line 5—5 of Fig. 4. Fig. 6 is an enlarged detail view of a portion of the shaft used in connection with this invention showing the manner of securing the fingers to the shaft.

The numeral 10 indicates the delivery end of the tube of a pneumatic hay stacker and this delivery end has the mouth portion cut away as indicated at 11, this being the usual construction employed although it is not essential in the operation of this attachment that this portion should be cut away in this manner. Surrounding the tube adjacent the mouth is a band 12 having its ends upturned to form ears 13. These ears 13 are held together by means of the usual bolt 14 so that this band is clamped firmly on the tube near the end. On each side of this band is secured a downwardly projecting arm 15 through the lower ends of which arms passes a shaft 16 preferably composed of a piece of gas pipe. This shaft 16 has formed therein a series of diametrically disposed spaced parallel openings 17 wherethrough extend a series of fingers 18 having bent-over portions 19 formed on their butt ends to constitute heads. The outer fingers are made heavier than the intermediate fingers as indicated at 20. Extending over the heads 19 of these fingers is a plate 21 having a segmental cross section as can be clearly seen by reference to Fig. 5. This plate is secured to the shaft 16 by suitable tap bolts 22. In this manner the fingers are all held firmly in the shaft. The shaft 16 extends through one of the arms 15 and on this extended end is mounted an upstanding lever 23 having an eye 24 at its upper end for the purpose of attaching a pull cord 25 which runs to a convenient place on the stacker so that the shaft 16 may be rotated in one direction by pulling on this cord. The fingers 20 and 18 are inclined upward, preferably with a reverse curve, as indicated in Fig. 1, and extend across the mouth of the delivery tube. On the outer fingers 20, which are slightly shorter than the fingers 19, are formed ears 26 whereto is pivoted the upper edge of an apron 27 which thus depends downward beneath the fingers. Attached to this apron 27 adjacent its lower edge is a cord or cable 28, the other end of which is preferably attached to the eye 24 so that it acts as a limiting connection between the apron and the lever 23.

In order to prevent the hay and grain from blowing off the sides of the attachment there is provided a pair of outside fingers 29 and these fingers are connected to extended ends formed on the shaft 16 and on a bar 30 which connects the fingers 20 at their upper and forward ends. On these fingers 29 are supported wind boards 31 which have their rear ends connected respectively to the lever 23 and to a lever 32 at the end of the shaft 16 opposite said lever 23.

In the operation of the device the fingers are adjusted to the desired position in front of the mouth of the delivery tube by means of the pull cord 25. When the blast is turned on and the mixed hay, chaff and grain issue from the mouth of the tube the hay strikes against the fingers 20 and 19 and the blast carries it up over the upper edge of the apron 27. The chaff and grain, however, pass through the fingers, strike against the apron, and are deflected downward. By properly adjusting the length of the cord 28 the path of the downwardly deflected chaff and grain may be regulated so that a suitable receptacle may be placed to receive said chaff and grain.

There has thus been provided a simple and efficient device of the kind described and for the purpose specified.

Having thus described the invention, what is claimed as new, is:—

1. In an attachment for pneumatic hay stackers comprising a shaft, arms in which said shaft is journaled, a lever for rotating said shaft in said arms, means to attach said arms to a hay stacker delivery tube, said means being arranged to hold the shaft beneath said tube, fingers projecting from said shaft and inclined upwardly, an apron pivoted to and depending from the outer ends of certain of said fingers, and a limiting connection between the apron and lever to stop movement of the apron away from the lever.

2. In an attachment for pneumatic hay stackers, a band adapted to surround the delivery tube of a stacker adjacent the mouth thereof, means to clamp said band on said tube, arms attached to said band and projecting downwardly therefrom, a shaft journaled in the lower ends of said arms, an upstanding lever attached to said shaft and provided with means to attach a pull cord, spaced parallel fingers secured to said shaft and curved upwardly across the mouth of said tube, an apron pivoted to the outer ends of certain of said fingers and depending therefrom, and a cable connecting the lower part of the apron with said lever.

3. In an attachment for pneumatic hay stackers, a band adapted to surround the delivery tube of a stacker adjacent the mouth thereof, means to clamp said band on said tube, arms attached to said band and projecting downwardly therefrom, a shaft journaled in the lower ends of said arms, an upstanding lever attached to said shaft and provided with means to attach a pull cord, spaced parallel fingers secured to said shaft and curved upwardly across the mouth of said tube, an apron pivoted to the outer ends of certain of said fingers and depending therefrom, a cable connecting the lower part of the apron with said lever, and wind boards carried at the sides of the series of fingers.

In testimony whereof, I affix my signature, in presence of two witnesses.

CONRAD LANGUM.

Witnesses:
J. E. WALKER,
CARL PETTERSON.